May 12, 1925.

H. W. GRUNOW

WOODWORKING MACHINE

Filed Nov. 3, 1922

H.W. Grunow
INVENTOR

May 12, 1925.

H. W. GRUNOW

WOODWORKING MACHINE

Filed Nov. 3, 1922

—STRAIGHT CUT—

FIG. 10.

—CONVEX CUT—

FIG. 11.

—CONCAVE CUT—

FIG. 12.

H. W. Grunow
INVENTOR

BY Victor J. Evans
ATTORNEY

WITNESS:

Patented May 12, 1925.

1,537,820

UNITED STATES PATENT OFFICE.

HERMAN W. GRUNOW, OF SAGINAW, MICHIGAN, ASSIGNOR OF ONE-HALF TO ERNEST E. GRUNOW, OF SAGINAW, MICHIGAN.

WOODWORKING MACHINE.

Application filed November 3, 1922. Serial No. 598,950.

*To all whom it may concern:*

Be it known that I, HERMAN W. GRUNOW, a citizen of the United States, residing at Saginaw, in the county of Saginaw and State of Michigan, have invented new and useful Improvements in Woodworking Machines, of which the following is a specification.

This invention relates to improvements in wood working machines, the principal object of the invention being to so arrange the cutting head and feeding means that two pieces of material can be fed to the cutting head at the same time, one on one side and one on the other of the cutting head.

Another object of the invention is to so arrange the parts that one piece of material may be cut in the same manner as the other piece so that the two pieces will match each other to provide a perfect joint, such as a glue joint.

Another object of the invention is to provide adjustable guides for regulating the depth of cut and also to provide movable guides for the sizing of the stock.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1:
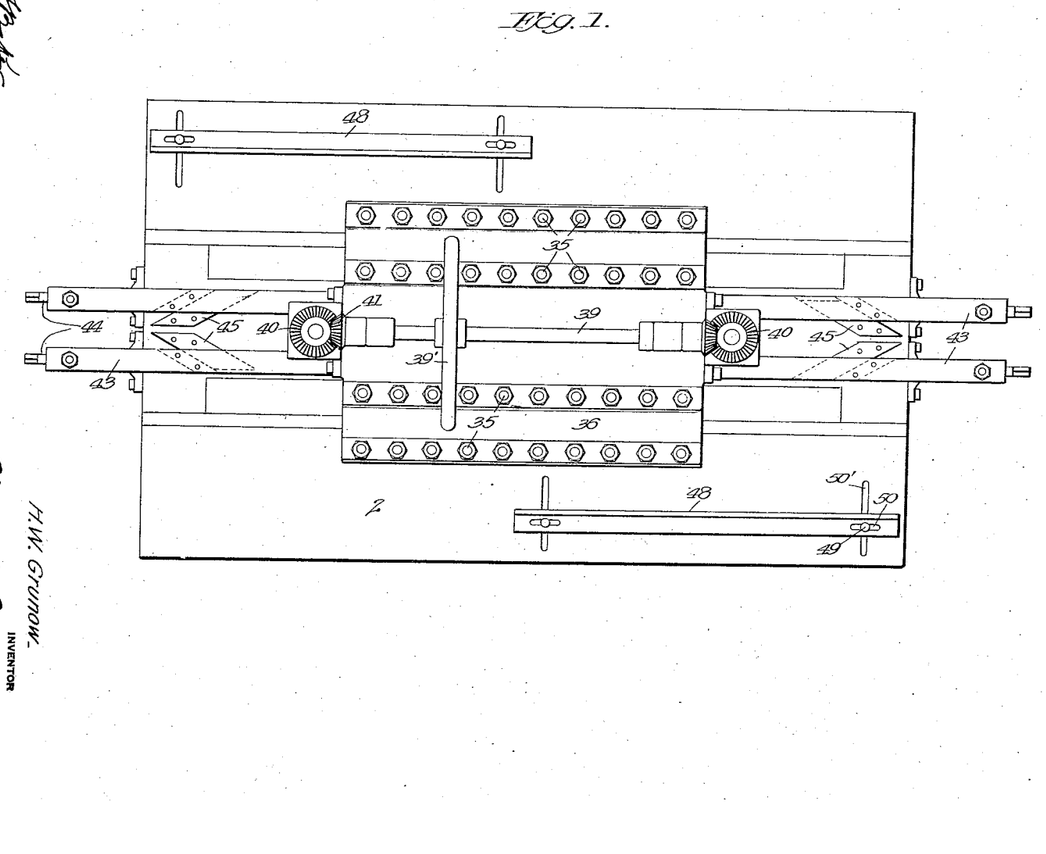
Figure 1 is a plan view of the invention.
Figure 2:
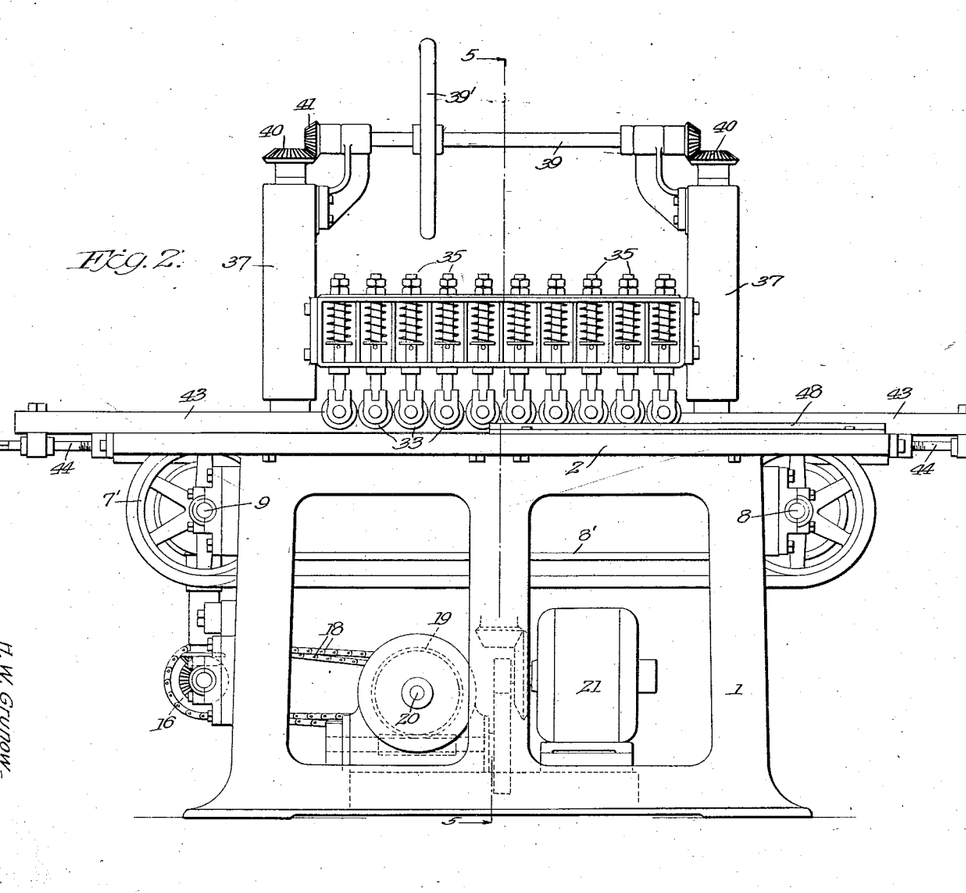
Figure 2 is a view of one side thereof.
Figure 3:
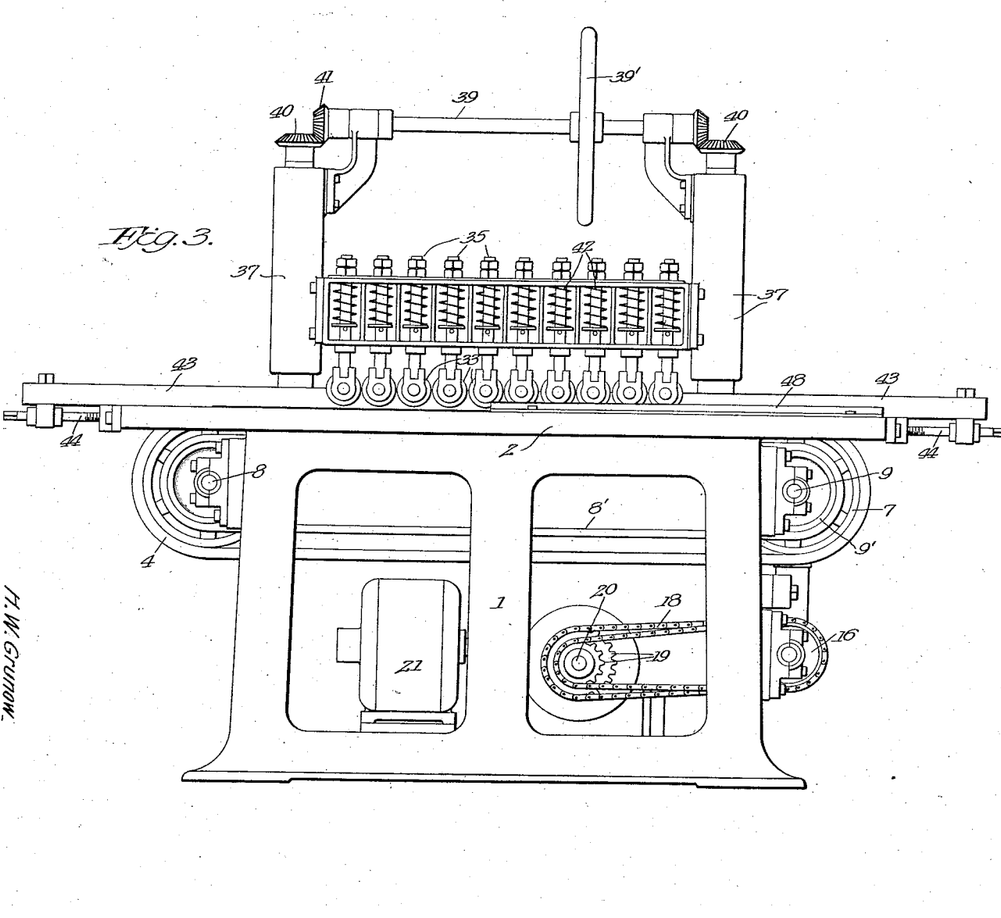
Figure 3 is a view of the other side.
Figure 4:
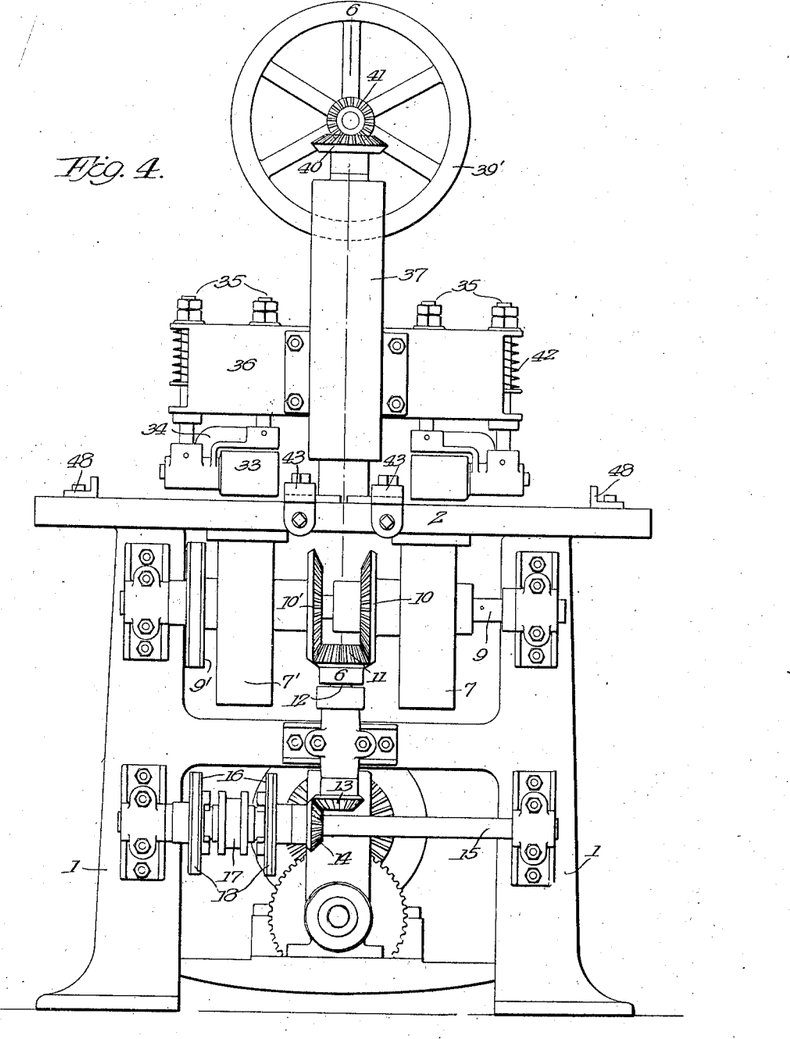
Figure 4 is a front view.
Figure 5:
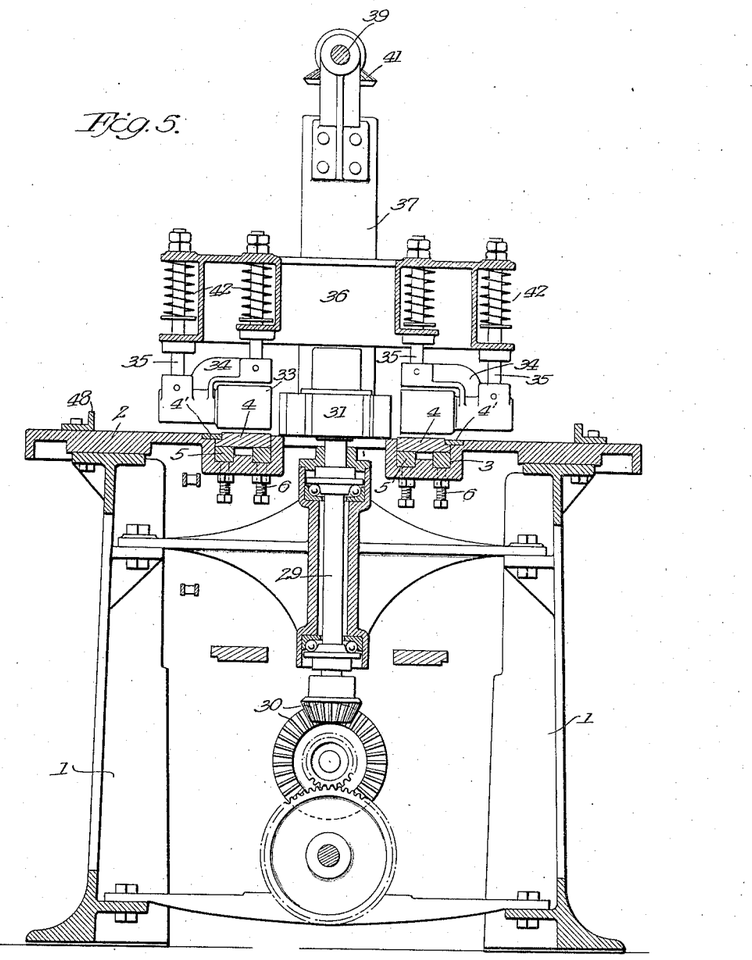
Figure 5 is a section on line 5—5 of Figure 2.
Figure 6:
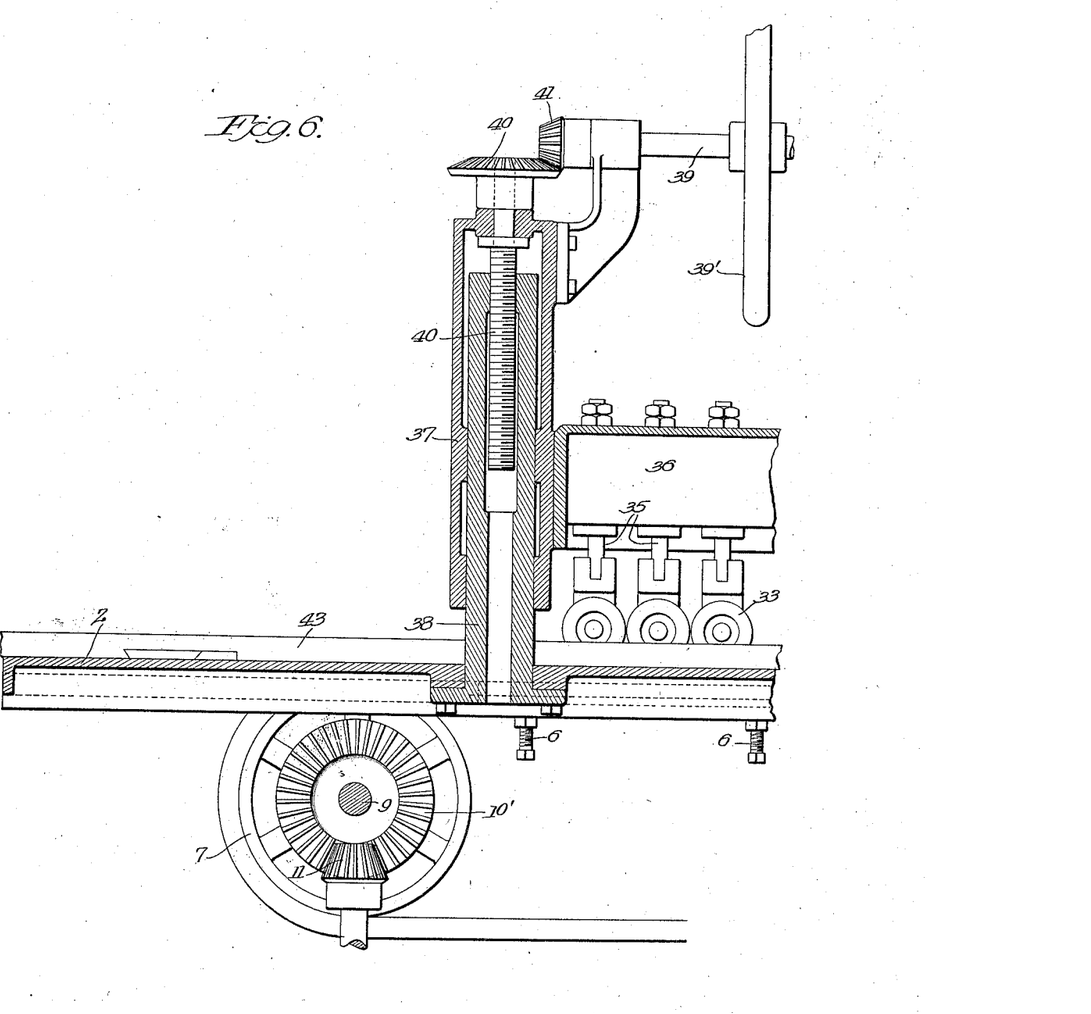
Figure 6 is a sectional view through a portion of a machine showing the means for raising and lowering the pressure rollers.
Figure 7:
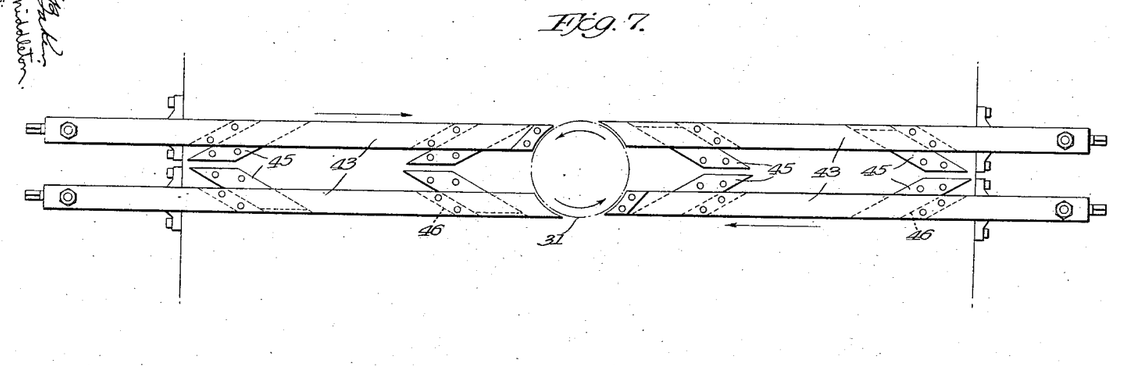
Figure 7 is a plan view of the adjustable guides for the stock.

In these views 1 indicates a supporting frame which includes the flat top 2 which is provided with the longitudinally extending grooves 3, which are arranged at each side of the center and which are adapted to receive the upper reaches of the endless feed chains 4, these chains being held in place by the strips 4'. Strips 5 are placed in each groove and these strips are vertically adjustable by means of the set screws 6. The feed chains pass over the pulleys 7, as shown in Fig. 3 of the drawings, a pair of which is arranged adjacent each end of the frame. The pulleys at one end of the frame are mounted on a shaft 8 and those at the other end of the frame are mounted on a shaft 9. The shafts 8 and 9 are connected together by a belt 8' which passes over the pulleys 9' which are keyed to the shafts 8 and 9. One of the pulleys 7 is fixed to its shaft 9 and the other is rotatably mounted on the shaft 8. Pulleys are secured to the respective shafts 8 and 9 and are connected with a bevel gear 10 rotatably mounted on shaft 9 and a second bevel gear 10' respectively which is keyed to said shaft 9. These bevel gears mesh with a bevel pinion 11, carried by a vertical shaft 12 which is supported in the frame at one end thereof and has secured thereto, at its lower end, a bevel gear 13. This gear 13 is engaged by a gear 14 on a shaft 15, journaled in the frame and which is provided with the sprockets 16. These sprockets are adapted to be engaged by the clutch 17 so that either sprocket may be connected with the shaft 15 or said sprockets can be disconnected from the shaft. Chains 18 pass over these sprockets and over the sprockets 19 on a shaft 20 which is geared to the shaft of a motor 21. The sprockets 19 are of different sizes so that the shaft 15 can be rotated at two different speeds.

From the above it will be seen that the shaft 15 can be driven at either one of two different speeds from the motor by the shifting of the clutch 17 and said shaft 15 will drive the vertical shaft 12 through the gearing and this vertical shaft will rotate the chain pulleys in opposite directions, through the pinion 11 and the gears 10 and 10' and thus the feed chains will be moved in opposite directions so that when stock is placed on said chains at opposite ends of the machine they will both be moved towards the center by the chains. The arrangement of the parts on shafts 8 and 9 will act to pull the upper reaches of the chains in different directions, thus insuring the proper feeding of the stock by both chains. The strips 4' prevent slack in said upper reaches.

Figure 12:
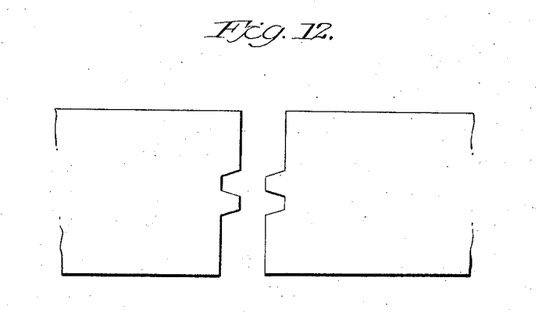
Figure 12 is a view showing two pieces of stock which have been passed through the machine.

A vertical shaft 29 is arranged at the center of the machine with its upper end projecting above the top 2. This shaft is connected with the shaft of the motor by the gears 30 and a cutter head 31 is connected with the upper end of the shaft, and said cutter head is vertically adjustable on the shaft in the usual manner. This cutter head is so formed that it will operate upon pieces of stock, fed past the same by the feed chains 4, and as the stock moves in opposite directions the knives on one side of the head will be operating on one piece of stock while those on the other will be operating upon the opposite piece of stock so that both pieces will be operated on by the knives in the same manner and one piece will be the complement of the other so that the two pieces can be placed together to make a perfect fit, such as to provide a glue joint, as shown in Figure 12. It will of course be understood that different kinds of cutter heads may be used with the device. For instance, the cutter head may be provided with knives for forming a tongue and groove glue joint in the stock or it may be provided with knives to do rabbeting, molding and the like.

The stock is held on the chains by the rolls 33 which are carried by the brackets 34, each bracket being connected to a pair of spring pressed rods 35, all the rods being carried by a yoke 36 which is connected with the columns 37, mounted upon the uprights 38, and which are vertically adjustable by means of the manually operated shaft 39 and the screw shafts 40 which are geared to the shaft 39 by the gears 41 and engage threaded holes in the uprights. The springs for the rods are shown at 42. By turning the shaft 39 by means of the hand wheel 39' the columns 37 will be moved vertically to adjust the rolls in relation to the stock upon the feed chains, thus regulating the pressure of the rolls upon the stock.

Figure 8:
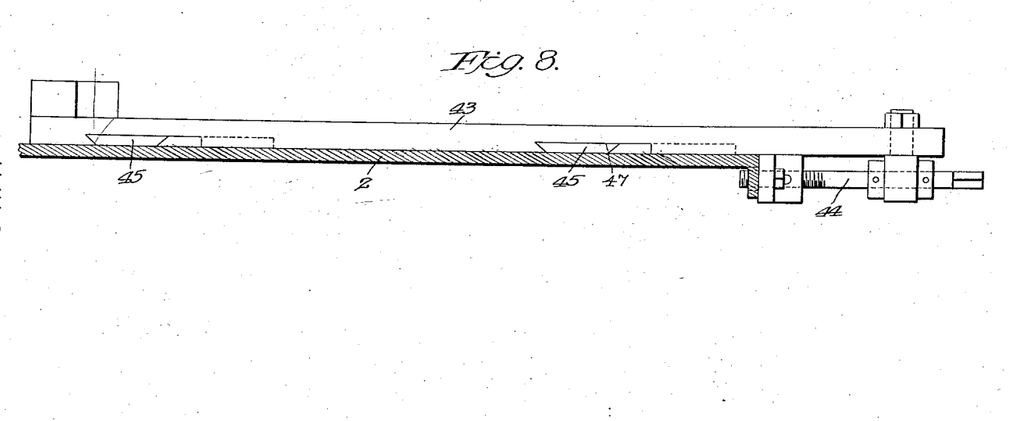
Figure 8 is a sectional view through Figure 7.

A guide 43 is provided for the stock upon each feed chain, the inner end of each guide being rounded and spaced from the cutter head. Each guide is adjusted to regulate the depth of cut by means of the hand operated screw shaft 44, which passes through a part of the guide, and the inclined adjustable projections 45 engaging slots 46 in the guides as shown in Fig. 8 of the drawings. Thus by rotating the shaft 44 by means of a crank handle (not shown) the projections and slots will cause the guide to move transversely and thus regulate the amount of stock engaged by the knives of the cutter head. I also provide a guide 48 for the outer edge of each piece of stock, each guide 48 being adjustably mounted on the flat top by the screws 49 engaging slots 50 in the guide and slots 50' in the top. These guides will act to size the stock so that stock of one size will be passed through the machine.

Figure 9:
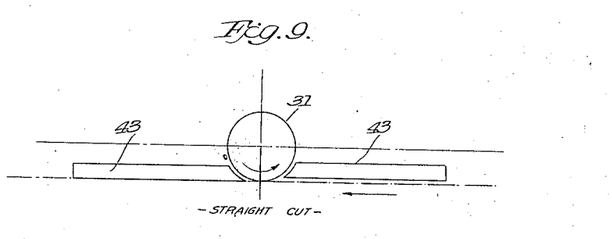
Figures 9, 10 and 11 are diagrammatic views showing the positions of the guides for different kinds of cuts.
Figure 10:
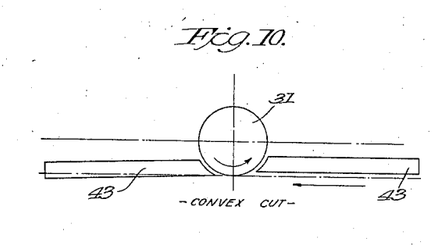
Figure 11:
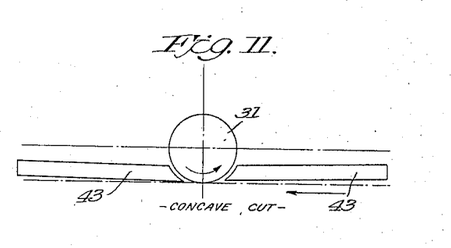

From the above it will be seen that the machine has but a single spindle and cutter head but the feeding means are so arranged that two pieces of stock can be passed through the cutting head from opposite ends of the machine so that the cutting head will operate on both pieces at the same time. The feeding of the stock is automatic and the pieces are fed in perfect alignment by the endless chains and the pressure rolls. The guides 43 are adjustable for regulating the depth of cut and also for lead which makes the stock either perfectly straight or slightly convex or concave, as shown in Figures 9, 10 and 11. By placing the proper knives on the cutter head the device can be used for rabbeting, molding or grooving.

As shown in Figures 9, 10 and 11, when it is desired to make a straight cut both the front and rear guides 43 are set parallel with the feed chain and the center line of the machine with the rear guide set away from the center line at a distance equal to the radius of the cutter. The front guide is set slightly closer to the center line according to the amount of stock necessary to be removed by the cutter. This is shown in Figure 9. As shown in Figure 10 the front guide is set in the same position for a convex cut as for a straight cut but the rear guide is set at an angle, its cutter-end being at a distance equal to the radius of cutter from the center-line of the machine, while its further end is at a distance greater than the radius of cutter from the center-line of machine. To produce the concave cut, which is the desirable one for glue joints, the front guide is set at an angle to the center line of the machine; its greatest distance from the center line of machine being at the end remote from the cutter, where it is still less than the radius of the cutter, according to the amount of stock to be removed.

The rear guide cutter end is again, as in each case, at a distance equal to the radius of cutter from the center line of machine, while the further end of rear guide is less than the cutter radius from the center line of the machine.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

In a wood working machine, a supporting frame including a flat top provided with longitudinally extending grooves arranged adjacent and to each side of the center thereof, rotatably mounted endless feed chains having their upper reaches arranged to slide in said grooves, strips having portions overlying the outer marginal edge of the said grooves and adapted to retain said chains therein, spaced vertically adjustable strips adapted to engage the side walls of said grooves and the bottom of the said portion of said chains within the grooves, a cutter head horizontally rotatably mounted between the grooves, guide members longitudinally disposed between the grooves and having their inner ends terminating adjacent the cutter head, and means for adjusting said guide members with respect to the cutter by longitudinal movement thereof.

In testimony whereof I affix my signature.

HERMAN W. GRUNOW.